United States Patent
Chandra et al.

(10) Patent No.: US 11,166,230 B1
(45) Date of Patent: Nov. 2, 2021

(54) DONOR SELECTION FOR RELAY NODES BASED ON A NUMBER OF COMPONENT CARRIERS

(71) Applicant: Sprint Spectrum LP, Overland Park, KS (US)

(72) Inventors: Amrit Kumar Chandra, Ashburn, VA (US); Charles Manganiello, Paola, KS (US); David Zhijun Sun, Broadlands, VA (US); Jay R. Chernoff, Pawleys Island, SC (US); Kristian Kai Johns, Ashburn, VA (US); Liang Li, Darnestown, MD (US); Mayur Shirwadkar, Arlington, VA (US); Neehar Kulkarni, Herndon, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 52 days.

(21) Appl. No.: 16/688,124

(22) Filed: Nov. 19, 2019

(51) Int. Cl.
| | |
|---|---|
| *H04W 48/20* | (2009.01) |
| *H04W 72/04* | (2009.01) |
| *H04B 17/318* | (2015.01) |
| *H04W 24/10* | (2009.01) |
| *H04W 48/08* | (2009.01) |
| *H04L 5/00* | (2006.01) |

(52) U.S. Cl.
CPC .......... *H04W 48/20* (2013.01); *H04B 17/318* (2015.01); *H04L 5/0051* (2013.01); *H04W 24/10* (2013.01); *H04W 48/08* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 9,179,444 B2 | 11/2015 | Van Phan et al. | |
| 9,191,098 B2 | 11/2015 | Kazmi et al. | |
| 2013/0040558 A1* | 2/2013 | Kazmi ............... | H04B 7/15507 455/9 |

* cited by examiner

*Primary Examiner* — Hong S Cho

(57) ABSTRACT

Selecting a donor access node for a relay node based on a number of component carriers includes identifying one or more potential donor access nodes deploying one or more carriers, measuring a reference signal strength for each of the one or more potential donor access nodes, determining which of the one or more potential donor access nodes deploys a highest number of component carriers, and sending a request to attach to the potential donor access node deploying the highest number of component carriers and having a reference signal strength that meets a reference signal criteria.

20 Claims, 8 Drawing Sheets

DONOR SELECTION FOR RELAY NODES BASED ON A NUMBER OF COMPONENT CARRIERS

TECHNICAL BACKGROUND

As wireless networks evolve and grow, there are ongoing challenges in providing high-quality service to increasing numbers of wireless devices in various coverage areas of a wireless network. One approach to improving service quality and coverage is to implement relay nodes for relaying communication between a base station or donor access node, and an end-user wireless device. Combinations of wireless devices designated as relays (henceforth, "relay wireless devices") that are co-located with relay access points may be used at the edge of a coverage area of a donor access node to improve coverage and/or service, as well as in crowded areas having a high number of other wireless devices to increase the available throughput to the end-user wireless devices being relayed. the relay node can be configured to relay data between an access node and one or more end-user wireless devices attached to the relay node. The relay node may be a small cell access node, a home eNodeB, etc. In an exemplary embodiment, the relay node includes a relay wireless device coupled to a relay access point and is configured to relay data packets between an access node and an end-user wireless device attached to a wireless air interface deployed by the relay access point. Alternatively, the relay node is a combined unit that includes transceivers configured to communicate with a relay node and to deploy a wireless air interface to which end-user wireless devices can attach. In either case, when providing service to a relay node, the serving access node(s) may be referred to as donor access node(s), and any wireless connection between a donor access node and a relay node may be referred to as a backhaul connection. Further, the donor access node may include an access node of any type, including macrocell access nodes such as Long-Term-Evolution (LTE) eNodeBs or 5G New Radio (NR) gNodeBs, mini access nodes, home eNodeBs or gNodeBs, etc.

However, with the increasing implementation of various access nodes deploying carriers of various radio access technologies (RATs) such as 5G New Radio (NR) over existing RATs such as 3G and 4G Long Term Evolution (LTE), there are additional considerations regarding how relay nodes can effectively service wireless devices that are attached to it. In particular, when a relay node attempts to select a donor access node from among a plurality of different donor access nodes, the relay node performs a scan for reference signal measurements of nearby donor access nodes, and selects a donor access node that has better signal conditions based on the reference signal measurements. However, the relay node does not consider how many carriers are being deployed by each donor access node. Whereas, donor access nodes with greater numbers of carriers may provide greater resources and, therefore, better throughput than donor access nodes deploying fewer carriers. For example, aggregating multiple carriers with lower signal strengths may provide a more effective backhaul for a relay node than a single carrier with a higher signal strength. Thus, simply selecting donor access nodes with higher reference signal strengths can limit the potential of relay nodes, and potentially cause service interruptions to users of wireless devices connected to the relay node, and unnecessary signaling to disconnect and reconnect between donor access nodes.

Overview

Exemplary embodiments described herein include systems, methods, and processing nodes for selecting a donor access node for a relay node based on a number of component carriers deployed by the donor access node. An exemplary method for selecting a donor access node includes.

An exemplary system for selecting a donor access node includes a processing node, and a processor coupled to the processing node. The processor can be configured to perform operations including An exemplary processing node for selecting a donor access node is configured to perform operations including.

DETAILED DESCRIPTION

Figure 1:
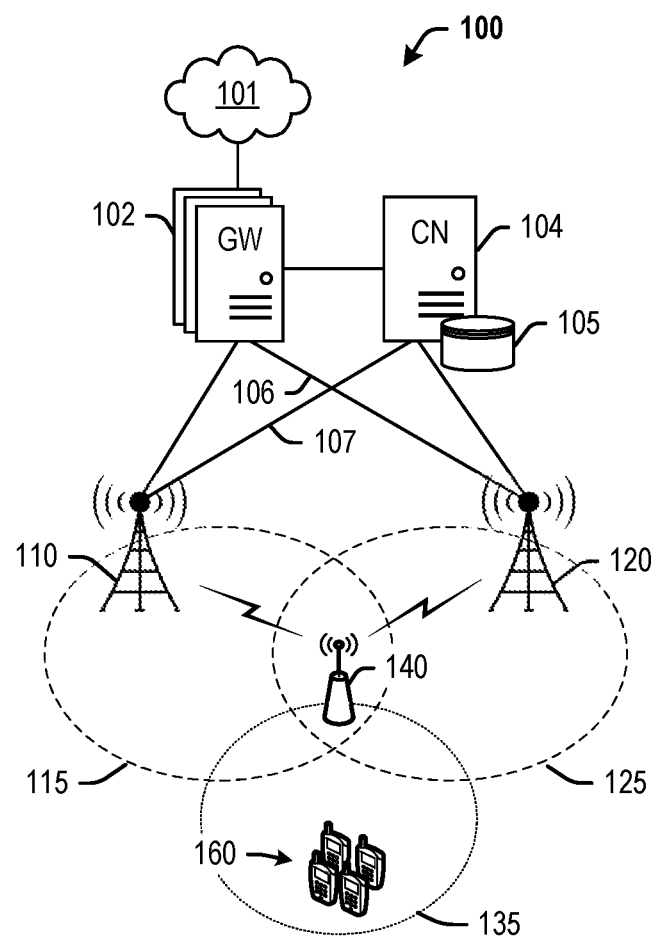
FIG. 1 depicts an exemplary system for selecting a donor access node for a relay node based on a number of component carriers per donor access node.

Methods, systems, and processing nodes for selecting a donor access node for a relay node based on a number of component carriers per donor access node. As described above, donor access nodes deploying a greater number of component carriers may provide a stronger backhaul for a relay node, despite having reference signal strengths that are measured lower than other donor access nodes deploying fewer component carriers. Thus, exemplary relay nodes described herein are configured (or instructed) to identify and prioritize donor access nodes having higher numbers of component carriers. Methods described herein include identifying network entities (such as donor access nodes and core networks associated therewith) based on various identifiers that are broadcast over different cells or sectors. For example, a system information messages such as SIB1 in both LTE and 5G networks includes a public land mobile number (PLMN), NR Cell Identity (NCI), and an E-UTRA cell identifier (ECI) that identifies a donor access node as well as cells or carriers deployed therefrom. Other identifiers include a physical cell identifier (PCI), NR Cell Global Identifier (NCGI) and/or an E-UTRAN cell global identifier (ECGI), which includes both the PLMN and the ECI, a mobile country code (MCC), mobile network code (MNC), and so on.

Further, each donor access node is configured to deploy different cells (or "carriers") that use different frequencies, over different geographical areas referred to as "sectors."

Multiple carriers of a donor access node may broadcast their own ECI and PCI. For a given sector, all carriers within the sector can have the same PCI and donor access node identifier (e.g. eNodeB ID or gNodeB ID). Therefore, different carriers (having different carrier identifiers) that share the same PCI and donor access node identifier can be identified as being deployed by a single donor access node. Thus, upon scanning in various directions (using, for example, steerable antennae or a 360 degree antenna array), a relay node can search for carriers on various frequencies (or frequency bands) and, at each angle, identify the aforementioned network information for all available carriers using one or more frequency bands. Scanning a specific frequency or frequency band may be performed using known frequency identifiers, such as an E-UTRA Absolute Radio Frequency Channel Number (EARFCN) or, in 5G networks, a NR-Absolute Radio Frequency Channel Number (NR-ARFCN). For example, various EARFCNs and/or NR-ARFCNs can be stored on the relay node, and carriers for each frequency identifier scanned at one or more scan angles. Further, the relay node can measure a received signal strength (e.g. RSRP) of all available carriers to determine whether or not the received signal strength meets a minimum threshold.

Upon scanning the network identifiers (acquired from, for example, a SIB1 message), the relay node can identify carriers deployed from each potential donor access node. These carriers are stored locally on the relay node as "available carriers" along with other parameters such as the RSRP and SINR for each carrier and at each scan angle. Upon completing scanning at all angles, the relay node can prioritize which donor access nodes are deploying the highest number of carriers that have the RSRP within the minimum threshold, and request to attach to the donor access node having the highest number of carriers, since the multiple carriers can be used as component carriers and aggregated to maximize bandwidth of the backhaul connection. In other words, given several potential donor access nodes having reference signal strengths that meet a minimum threshold, the potential donor access node deploying the highest number of carriers is chosen for the relay node, despite there being other potential donor access nodes with higher signal strengths. Further, given an equal number of carriers for two potential donor access nodes, the potential donor access node with the greater signal strength may be chosen for the backhaul connection.

Thus, exemplary methods described herein include identifying a plurality of potential donor access nodes for the relay node, and requesting to attach to a potential donor access node having a highest number of component carriers from among the plurality of potential donor access nodes. Similar operations may be performed by an exemplary system described herein. A processing node in such an exemplary system (for example, a relay node or access node) may be configured to perform operations including identifying one or more potential donor access nodes deploying one or more carriers, measuring a reference signal strength for each of the one or more potential donor access nodes, determining which of the one or more potential donor access nodes deploys a highest number of component carriers, and sending a request to attach to the potential donor access node deploying the highest number of component carriers and having a reference signal strength that meets a reference signal criteria. Similar operations may be performed by a processing node communicatively coupled to any other network node within the wireless network. The processing node can be coupled to a relay node. Consequently, an exemplary processing node can be configured to perform operations including determining a number of component carriers deployed by each of a plurality of potential donor access nodes within range of a relay node, determining that a reference signal strength of each component carrier meets a first threshold, and requesting to attach to the potential donor access node deploying the highest number of component carriers, wherein a reference signal strength of the potential donor access node is less than a reference signal strength of other potential donor access nodes. These and other embodiments are further described herein and with reference to FIGS. 1-8.

FIG. 1 depicts an exemplary system 100 comprising a communication network 101, gateway 102, controller node 104, access node 110, access node 120, relay node 140, and end-user wireless devices 160. Access node 110 is configured to deploy a radio air interface over a coverage area 115, and access node 120 is configured to deploy a radio air interface over a coverage area 125. By virtue of being within both coverage areas 115 and 125, relay node 140 can be in direct communication with either or both access nodes 110, 120. Further, relay node 140 may be configured to deploy another carrier over a coverage area 135 to which end-user wireless devices 160 can attach. Relay node 140 can be configured to relay data packets between end-user wireless devices 160 and one or both of access nodes 110, 120, which may be referred to as "donor" access nodes when communicating via relay node 140. Thus, wireless devices 160 that are outside a coverage area of donor access nodes 110, 120 may access network services from donor access nodes 110, 120 by virtue of being connected to relay node 140.

Moreover, a processing node within system 100 (for example, communicatively coupled to access nodes 110, 120, controller node 104, relay node 140, or any other network node) can be configured to select a donor access node for relay node 140 from among donor access nodes 110, 120, by acquiring network information for each carrier deployed by donor access nodes 110, 120, and requesting to attach to a potential donor access node having a highest number of component carriers from among potential donor access nodes 110, 120. To enable this, relay node 140 can be configured to scan for known frequency identifiers using one or more antennae of the relay node 140. The scanning may be performed when relay node 140 is activated or powered on, and may be performed over 360 degrees in set increments, such as 30 degrees (with 12 scans being performed to complete 360 degrees). Other combinations of increments and scan angles will be evident to those of ordinary skill in the art in light of this disclosure.

Further, for each scan angle, carriers are scanned for a plurality of known frequency identifiers and a number of carriers deployed by each donor access node are determined based on the network information. Scanning each specific frequency or frequency band may be performed using known frequency identifiers, such as an E-UTRA Absolute Radio Frequency Channel Number (EARFCN). EARFCN is a standard frequency numbering scheme to identify various frequencies within a band. Each EARFCN (frequency) deployed by a donor access node may be considered a separate carrier. For example, various EARFCNs can be stored on the relay node 140, and carriers for each EARFCN scanned at one or more scan angles. Upon detecting a carrier for a first known frequency identifier (e.g. a carrier deployed by one of donor access nodes 110, 120), network information associated with the carrier can be obtained by parsing a broadcast for various identifiers. In an exemplary embodiment, the network information includes a network identifier, a donor access node identifier, and a carrier identifier. For example, a system information messages such as SIB1 in both LTE and 5G networks includes an E-UTRAN Cell Global Identifier (ECGI), which is a 52-bit string comprising a PLMN (network identifier) and an ECI. Alternatively or in addition, in 5G networks, a 60 bit NR Cell Global ID (NCGI) can be used, which includes a PLMN identifier and a NR Cell identifier (NCI). The PLMN identifier includes network identifiers such as MCC, MNC, and the ECI/NCI includes donor access node identifiers and carrier identifiers, such as the eNB/gNB identifier and cell identifier. Further, the broadcast includes a primary cell identifier (PCI), which is another donor access node identifier. Further, at each angle (and for each frequency/EARFCN), reference signal strengths of each carrier are obtained and stored at relay node 140. For any carrier for which the reference signal strength meets a minimum threshold, the carrier may be considered a potential or available carrier, and the donor access node deploying the carrier may be considered a "potential" donor access node.

These operations are repeated for different frequency identifiers (e.g. frequencies/EARFCNs) at a specified scan angle, and then repeated again for each different scan angle, until the 360 degree scan is complete for all frequencies. The number of carriers per donor access node can be determined from this information. For example, if donor access node 110 supports 3 EARFCNs (carriers) then all 3 EARFCNs will have same PCI. Within 28 bits of the ECI, each sector deployed from donor access node 110 will have the same eNB ID (20 bits) for all 3 carriers. Each carrier will have own unique 8 bit identifier. This 8 bit identifier will help to identify 3 carriers of the same donor access node. Therefore, if the relay node 140 scans 3 carriers with same PCI and eNB ID (20 bits) with a different 8 bit cell ID, then these EARFCNs will be considered as 3 cells of the same eNB. Since the Cell ID is associated with a donor access node's EARFCNs (carriers) to identify the different carriers within the donor access node, combining the EARFCN with the ECI (eNB ID plus Cell ID) helps to identify different cells of a donor access node. Based on all measurements, relay node 140 can generate a final scan list indicating the number of different EARFCNs (carriers) scanned for the same donor access node (based on donor access node identifiers, e.g. PCI and eNB ID), and add this information to scan list, and attach to the donor access node with the highest number of carriers. For example, if donor access node 110 is deploying 3 carriers and donor access node 120 is deploying 2 carriers donor, and both donor access nodes 110, 120 have reference signal strengths that meet a threshold, then donor access node 110 will be selected to provide the backhaul for relay node 140. This occurs even if donor access node 110 has a worse SINR or RSRP than donor access node 120.

Access nodes 110, 120 can be any network node configured to provide communication between relay node 140 and other wireless devices (not shown herein) and communication network 101, including standard access nodes such as a macro-cell access node, base transceiver station, a radio base station, an eNodeB device, an enhanced eNodeB device, an a next generation or gigabit NodeB device (gNodeB) in 5G networks, or the like. In an exemplary embodiment, a macro-cell access node can have a coverage area 115, 125 in the range of approximately five kilometers to thirty-five kilometers and an output power in the tens of watts. Further, relay node 140 may comprise any combination of a relay wireless device capable of communicating over a wireless backhaul, and a small-cell access node capable of deploying a wireless air interface for wireless devices 160. Relay node 140 may comprise any short range, low power, small-cell access nodes such as a microcell access node, a picocell access node, a femtocell access node, or a home eNodeB device.

Access nodes 110, 120 and relay node 140 can comprise a processor and associated circuitry to execute or direct the execution of computer-readable instructions to perform operations such as those further described herein. Briefly, access nodes 110, 120 and relay node 140 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 and relay node 140 can receive instructions and other input at a user interface. Access nodes 110, 120 communicate with gateway node 102 and controller node 104 via communication links 106, 107. Access nodes 110, 120 may communicate with each other, and other access nodes (not shown), using a wireless link or a wired link such as an X2 link. Components of exemplary access nodes 110, 120, relay node 140, and processing nodes coupled thereto, are further described with reference to FIGS. 2-5.

Wireless devices 160 may be any device, system, combination of devices, or other such communication platform capable of communicating wirelessly with access node 110, 120 and/or relay node 140 using one or more frequency bands deployed therefrom. Each of wireless devices 160 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by relay node 140 and wireless devices 160. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as network and carrier information for access nodes 110, 120, scan results from relay node 140, and so on. This information may be requested by or shared with access nodes 110, 120 and/or relay node 140 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication systems 100 may be, comprise, or include computers systems and/or processing nodes. This includes, but is not limited to: access nodes 110, 120, relay node 140, controller node 104, and/or networks 101, 201.

Figure 2:
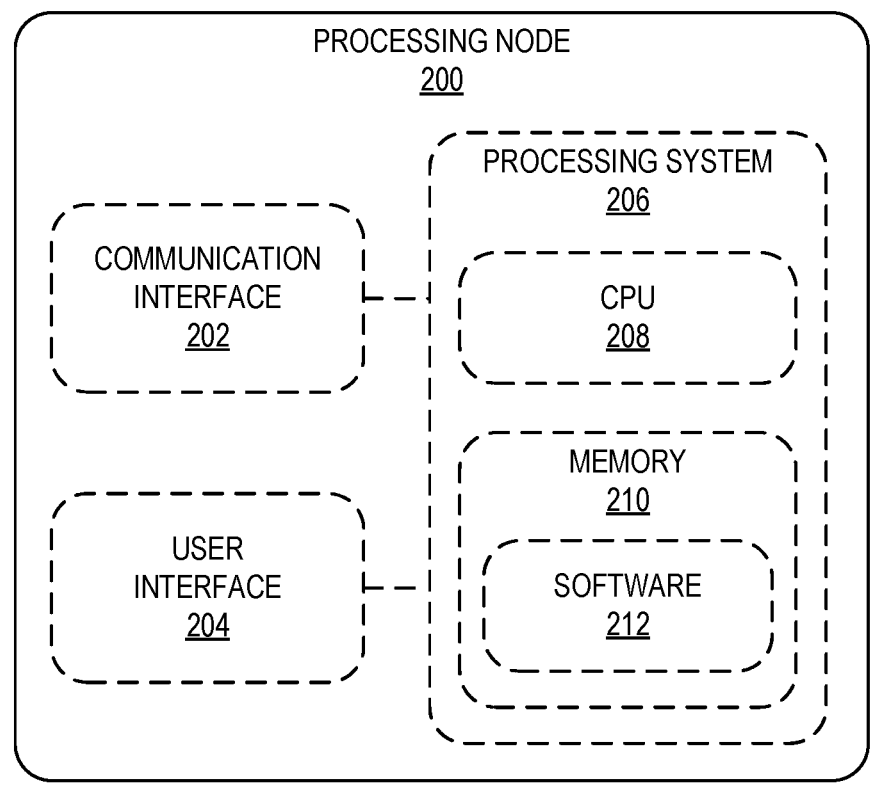
FIG. 2 depicts an exemplary processing node for selecting a donor access node for a relay node based on a number of component carriers per donor access node.

FIG. 2 depicts an exemplary processing node 200. Processing node comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Further, memory 210 can store a software 212, which may be executed to perform the interference mitigation operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 212 can include instructions for identifying a plurality of potential donor access nodes for the relay node, and requesting to attach to a potential donor access node having a highest number of component carriers from among the plurality of potential donor access nodes. In another exemplary embodiment, software 212 can include instructions for identifying one or more potential donor access nodes deploying one or more carriers, measuring a reference signal strength for each of the one or more potential donor access nodes, determining which of the one or more potential donor access nodes deploys a highest number of component carriers, and sending a request to attach to the potential donor access node deploying the highest number of component carriers and having a reference signal strength that meets a reference signal criteria. In another exemplary embodiment, software 212 can include instructions for determining a number of component carriers deployed by each of a plurality of potential donor access nodes within range of a relay node, determining that a reference signal strength of each component carrier meets a first threshold, and requesting to attach to the potential donor access node deploying the highest number of component carriers, wherein a reference signal strength of the potential donor access node is less than a reference signal strength of other potential donor access nodes.

Figure 3:
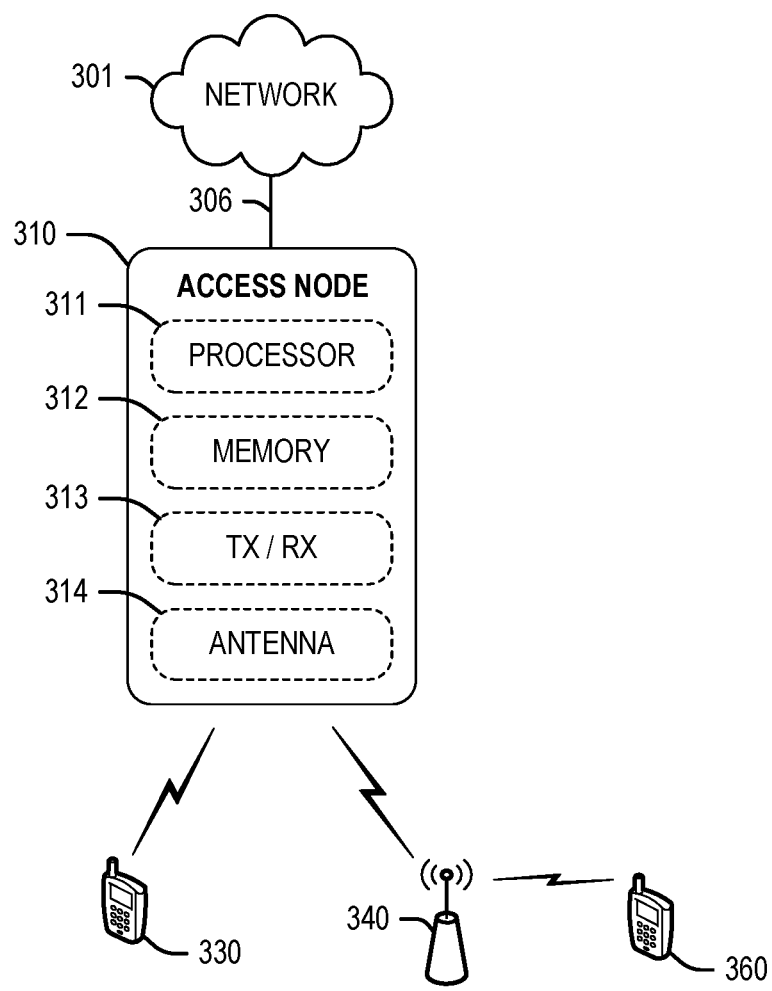
FIG. 3 depicts an exemplary donor access node.

FIG. 3 depicts an exemplary access node 310. Access node 310 may comprise, for example, a macro-cell access node, such as access node 110 described with reference to FIG. 1. Access node 310 is illustrated as comprising a processor 311, memory 312, transceiver 313, and antenna 314. Processor 311 executes instructions stored on memory 312, while transceiver 313 and antenna 314 enable wireless communication with wireless device 330 and relay node 340. Further, antenna 314 may include an array of antennae that are configured to deploy a radio air interface over one or more wireless sectors, form beams within these sectors, employ multiple-input-multiple-output (MIMO), etc.

Figure 4:
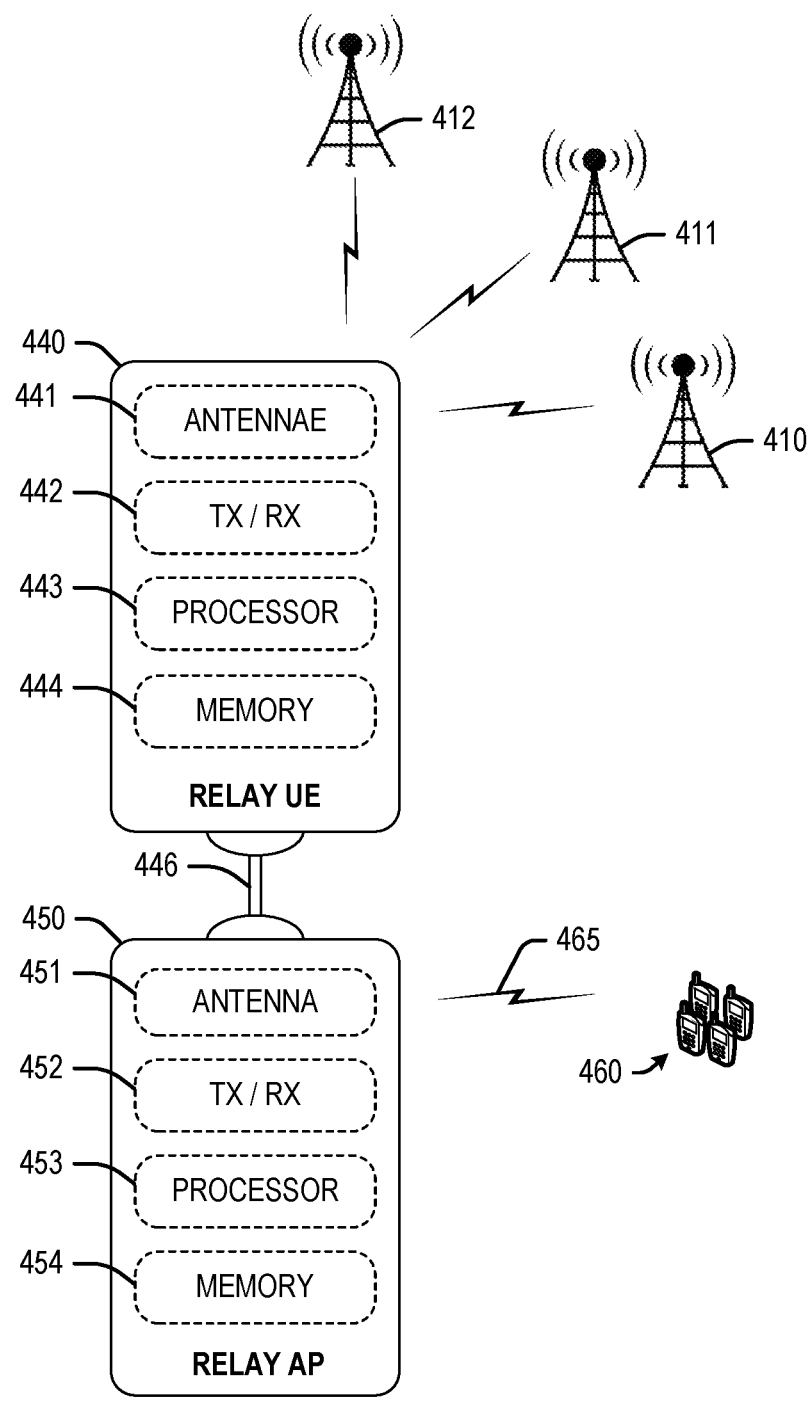
FIG. 4 depicts an exemplary relay node comprising a relay wireless device and a relay access point.

FIG. 4 depicts an exemplary relay node comprising a relay wireless device 440 and a relay access point (AP) 440. Relay wireless device 440 is illustrated as comprising a plurality of directional antennae 441 enabling communication with a plurality of donor access nodes 410, 411, 412, one or more transceivers 442, a processor 443, and a memory 444 for storing instructions that enable relay wireless device 440 to perform operations described herein. In some embodiments, relay wireless device 440 is referred to as a customer premise equipment (CPE), which includes any stationary LTE and/or 5G NR wireless device having a stronger computational & RF capability versus standard wireless devices, as well as a directional antenna and a dedicated power supply, enabling relay wireless device 440 to efficiently provide resources to wireless devices 460 via relay access point 450. Consequently, relay access point 450 may be co-located with relay wireless device 440, and is connected to relay wireless device 440 via a communication interface 446. Communication interface 446 may be any interface that enables direct communication between relay wireless device 440 and relay access point 450, such as USB, FireWire, Ethernet, or any other serial, parallel, analog, or digital interface.

In operation, relay wireless device 440 may be configured to relay network services from donor access nodes 410, 411, 412 to wireless devices 460 via relay access point 450. Relay wireless device 440 may begin to function as a relay wireless device by sending a message to donor access nodes 410, 411, 412 to indicate to donor access nodes 410, 411, 412 that wireless device 440 is functioning as a relay wireless device. Once status of relay wireless device 440 is established, relay wireless device 440 may instruct relay access point 450 to start accepting connection requests from one or more wireless devices such as wireless device 460. Further, relay access point 450 is illustrated as comprising an antenna 451 and transceiver 452 for enabling communication with wireless device 460, processor 453, and a memory 454 for storing instructions that are executed by processor 453. In some embodiments, relay access point 450 may be a home eNodeB. Moreover, although only one transceiver is depicted in each of relay wireless device 440 and relay access point 450, additional transceivers may be incorporated in order to facilitate communication across interface 426 and other network elements.

Further, memory 444 on relay UE 440 may include instructions for selecting a donor access node to provide a backhaul for relay UE 440 from among donor access nodes 410, 420, 430 by acquiring network information for each carrier deployed by donor access nodes 410, 420, 430 and requesting to attach to a potential donor access node having a highest number of component carriers from among potential donor access nodes 410, 420, 430. To enable this, relay UE 440 can be configured to scan for known frequency identifiers using one or more antennae of the relay UE 440. The scanning may be performed when relay UE 440 is activated or powered on and may be performed over 360 degrees in set increments, such as 30 degrees (with 12 scans being performed to complete 360 degrees). Other combinations of increments and scan angles will be evident to those of ordinary skill in the art in light of this disclosure. Further, for each scan angle, carriers are scanned for a plurality of known frequency identifiers and a number of carriers deployed by each donor access node 410, 420, 430 are determined based on the network information. Scanning each specific frequency or frequency band may be performed using known frequency identifiers. The network information further includes a network identifier, a donor access node identifier, and a carrier identifier. At each angle (and for each frequency/EARFCN), network information, reference signal strengths of each carrier are obtained and stored at relay UE 440. For any carrier for which the reference signal strength meets a minimum threshold, the carrier may be considered a potential or available carrier, and the donor access node deploying the carrier may be considered a "potential" donor access node. These operations are repeated for different frequency identifiers (e.g. frequencies/EARFCNs) at a specified scan angle, and then repeated again for each different scan angle, until the 360 degree scan is complete for all frequencies. The number of carriers per donor access node can be determined from this information as described herein. Based on all measurements, relay UE 440 can generate a final scan list indicating the number of different EARFCNs (carriers) scanned for the same donor access node (based on donor access node identifiers, e.g. PCI and eNB ID), and add this information to scan list, and attach to the donor access node with the highest number of carriers, irrespective of whether or not one potential donor access node's signal strength measures higher than another potential donor access node.

Figure 5:
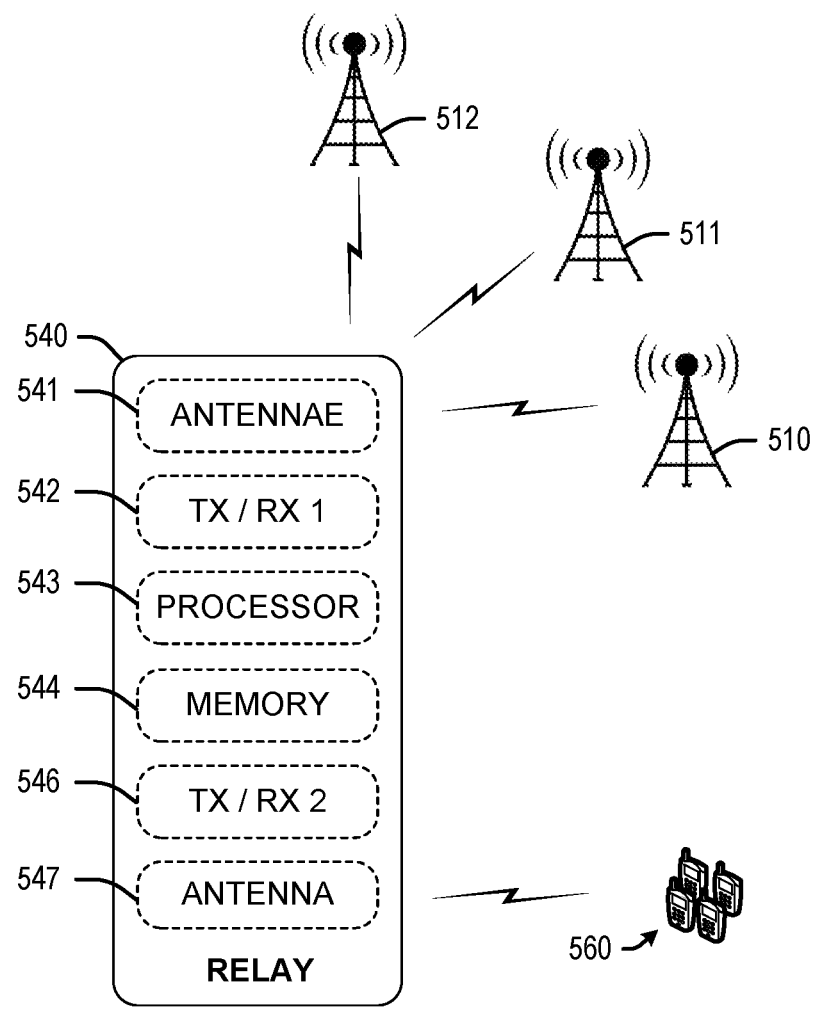
FIG. 5 depicts another exemplary relay node combining a relay wireless device and a relay access point.

In another exemplary embodiment, the relay node may integrate components of both relay wireless device 440 and relay access point 450 into a single unit. FIG. 5 depicts an exemplary relay node 540 of this type. Relay node 540 is illustrated as comprising a plurality of directional antennae 541 for enabling communication with a plurality of donor access nodes 510, 511, 512, one or more transceivers 542, a processor 543, and a memory 544 for storing instructions that are executed by processor 543 as described herein. Relay node 540 further includes another transceiver 546 and antenna 547 for enabling communication with wireless device 560. Memory 544 can include instructions that enable relay node 540 to perform operations similar to those described above with respect to FIG. 4.

In an embodiment, the relay nodes depicted in FIGS. 4-5 can be configured to function as one or more of a layer 1 (L1), layer 2 (L2), or layer 3 (L3) relay. A layer 1 relay functions as a booster or repeater. In other words, a layer 1 relay node performs an amplify and forward (AF) function. RF signals received from a donor access node are amplified and transmitted to end-user wireless devices. Likewise, RF signals received from end-user wireless devices are amplified and transmitted to donor access nodes. Alternatively or in addition, a layer 2 relay node performs a decode and forward (DF) function. RF signals received from a donor access node are demodulated and decoded, then encoded and modulated again before being transmitted to a wireless device. Likewise, RF signals received from a wireless device are demodulated and decoded, then encoded and modulated again before being transmitted to a donor access node. Alternatively, or in addition, a layer 3 relay node also performs a decode and forward function. However, a layer 3 relay node also performs additional processing (such as ciphering and/or data concatenation/segmentation/reassembly). In other words, relay node depicted herein performs demodulation and decoding of the received RF signals (either uplink or downlink), processes received data, then encodes, modulates, and transmits the data to a wireless device.

Figure 6:
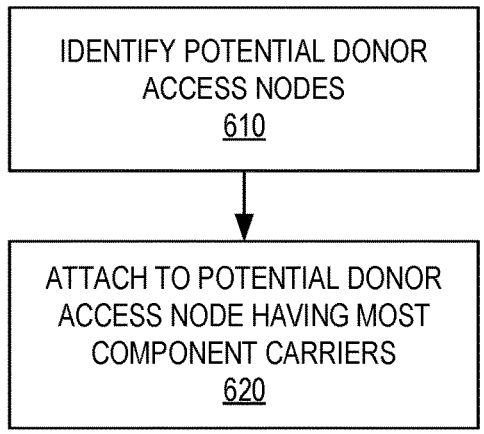
FIG. 6 depicts an exemplary method for selecting a donor access node for a relay node based on a number of component carriers per donor access node.

FIG. 6 depicts an exemplary method for selecting a donor access node for a relay node based on a number of component carriers per donor access node. The method of FIG. 6 may be implemented by a processing node communicatively coupled to one or more donor access nodes, relay nodes, controller nodes, or any other network node. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, potential donor access nodes are identified within range of a relay node and, at 620, the relay node attaches to the potential donor access node having the most component carriers. As described above, donor access nodes deploying a greater number of component carriers may provide a stronger backhaul for a relay node, despite having reference signal strengths that are measured lower than other donor access nodes deploying fewer component carriers. Thus, the relay node is configured (or instructed) to obtain various identifiers that are broadcast over different cells or sectors. For example, a system information messages such as SIB1 in both LTE and 5G networks includes a public land mobile number (PLMN), NR Cell Identifier (NCI), and an E-UTRA cell identifier (ECI) that identifies a donor access node as well as cells or carriers deployed therefrom. Other identifiers include a physical cell identifier (PCI), a NR Cell Global Identifier (NCGI) and/or an E-UTRAN cell global identifier (ECGI), which includes both the PLMN and the ECI or NCI, a mobile country code (MCC), mobile network code (MNC), and so on. Further, each donor access node is configured to deploy different cells (or "carriers") that use different frequencies, over different geographical areas referred to as "sectors." Multiple carriers of a donor access node may broadcast their own ECI and PCI. For a given sector, all carriers within the sector can have the same PCI and donor access node identifier (e.g. eNodeB ID or gNodeB ID). Therefore, different carriers (having different carrier identifiers) that share the same PCI and donor access node identifier can be identified as being deployed by a single donor access node. Thus, upon scanning in various directions (using, for example, steerable antennae or a 360 degree antenna array), a relay node can search for carriers on various frequencies (or frequency bands) and, at each angle, identify the aforementioned network information for all available carriers using one or more frequency bands. Scanning a specific frequency or frequency band may be performed using known frequency identifiers, such as an E-UTRA Absolute Radio Frequency Channel Number (EARFCN). For example, various EARFCNs can be stored on the relay node, and carriers for each EARFCN scanned at one or more scan angles. Further, the relay node can measure a received signal strength (e.g. RSRP) of all available carriers to determine whether or not the received signal strength meets a minimum threshold.

Upon scanning the network identifiers (acquired from, for example, a SIB1 message), the relay node can identify carriers deployed from each potential donor access node. These carriers are stored locally on the relay node as "available carriers" along with other parameters such as the RSRP and SINR for each carrier and at each scan angle. Upon completing scanning at all angles, the relay node can prioritize which donor access nodes are deploying the highest number of carriers that have the RSRP within the minimum threshold, and request to attach to the donor access node having the highest number of carriers, since the multiple carriers can be used as component carriers and aggregated to maximize bandwidth of the backhaul connection. In other words, given several potential donor access nodes having reference signal strengths that meet a minimum threshold, the potential donor access node deploying the highest number of carriers is chosen for the relay node, despite there being other potential donor access nodes with higher signal strengths. Further, given an equal number of carriers for two potential donor access nodes, the potential donor access node with the greater signal strength may be chosen for the backhaul connection.

Figure 7:
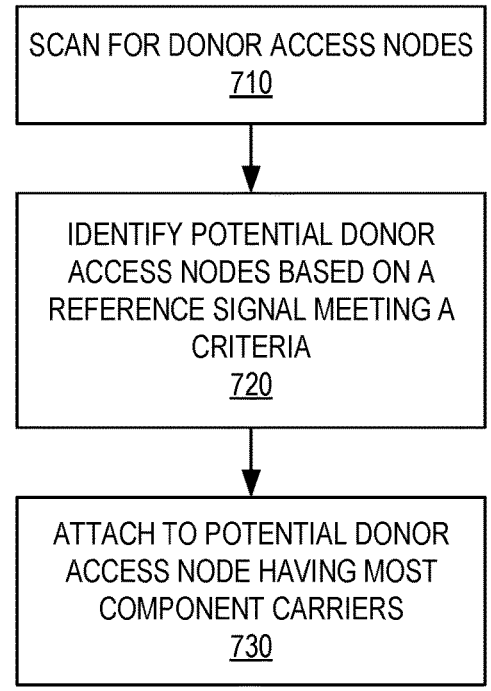
FIG. 7 depicts another exemplary method for selecting a donor access node for a relay node based on a number of component carriers per donor access node.

FIG. 7 depicts another exemplary method for selecting a donor access node for a relay node based on a number of component carriers per donor access node. The method of FIG. 7 may be implemented by a processing node communicatively coupled to one or more donor access nodes, relay nodes, controller nodes, or any other network node. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 710, the relay node scans for potential donor access nodes and, at 720, the relay node identifies potential donor access nodes with signal strengths that meet a criteria, such as a minimum threshold signal strength. For example, the relay node is configured (or instructed) to scan over a designated area (e.g. 360 degrees and/or increments thereof), and obtain various identifiers that are broadcast over different cells or sectors. At each angle, the relay node can identify network information for all available carriers using one or more frequency bands. Further, the relay node can measure a received signal strength (e.g. RSRP) of all available carriers to determine whether or not the received signal strength meets a minimum threshold. Upon scanning the network identifiers (acquired from, for example, a SIB1 message), the relay node can identify carriers deployed from each potential donor access node. These carriers are stored locally on the relay node as "available carriers" along with other parameters such as the RSRP and SINR for each carrier and at each scan angle.

Upon completing scanning at all angles, the relay node can prioritize which donor access nodes are deploying the highest number of carriers that have the RSRP within the minimum threshold, and at 730, request to attach to the donor access node having the highest number of carriers, since the multiple carriers can be used as component carriers and aggregated to maximize bandwidth of the backhaul connection. In other words, given several potential donor access nodes having reference signal strengths that meet a minimum threshold, the potential donor access node deploying the highest number of carriers is chosen for the relay node, despite there being other potential donor access nodes with higher signal strengths. Further, given an equal number of carriers for two potential donor access nodes, the potential donor access node with the greater signal strength may be chosen for the backhaul connection.

Figure 8:
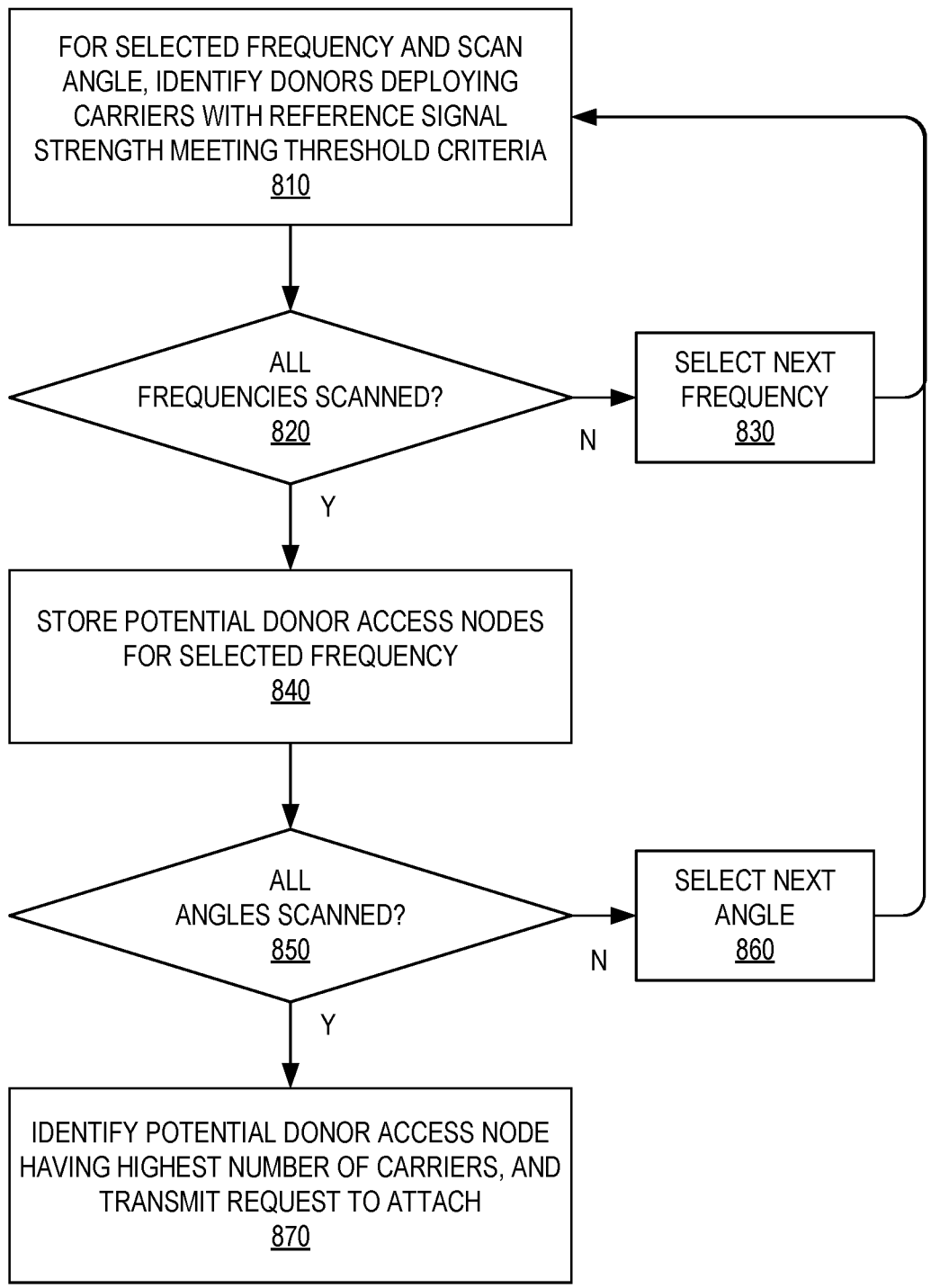
FIG. 8 depicts another exemplary method for selecting a donor access node for a relay node based on a number of component carriers per donor access node.

FIG. 8 depicts another exemplary method for selecting a donor access node for a relay node based on a number of component carriers per donor access node. The method of FIG. 8 may be implemented by a processing node communicatively coupled to one or more donor access nodes, relay nodes, controller nodes, or any other network node. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 810, for a selected frequency and scan angle, donor access nodes and carriers deployed therefrom are identified as being within range of a relay node. The scanning may be performed when the relay node is activated or powered on, or disconnected from a previous donor for any reason. Scanning each specific frequency or frequency band may be performed using known frequency identifiers, such as an E-UTRA Absolute Radio Frequency Channel Number (EARFCN). EARFCN is a standard frequency numbering scheme to identify various frequencies within a band. Each EARFCN (frequency) deployed by a donor access node may be considered a separate carrier. For example, various EARFCNs can be stored on the relay node, and carriers for each EARFCN scanned at one or more scan angles. Upon detecting a carrier for a first known frequency identifier, network information associated with the carrier can be obtained by parsing a broadcast for various identifiers. In an exemplary embodiment, the network information includes a network identifier, a donor access node identifier, and a carrier identifier. For example, a system information messages such as SIB1 in LTE networks includes an E-UTRAN Cell Global Identifier (ECGI), which is a 52-bit string comprising a PLMN (network identifier) and an ECI. The PLMN includes network identifiers such as MCC, MNC, and the ECI includes donor access node identifiers and carrier identifiers, such as the eNB identifier and cell identifier. In 5G networks, a 60 bit NR Cell Global identifier (NCGI) can be used which includes the PLMN and/or NR Cell ID (NCI). Further, the broadcast includes a primary cell identifier (PCI), which is another donor access node identifier. Further, at each angle (and for each frequency/EARFCN), reference signal strengths of each carrier are obtained. For any carrier for which the reference signal strength meets a minimum threshold, the carrier may be considered a potential or available carrier, and the donor access node deploying the carrier may be considered a "potential" donor access node.

These operations are repeated for different frequency identifiers (e.g. frequencies/EARFCNs) at a specified scan angle. For example, at 820 and 830, if remaining frequencies are left to be scanned for a given scan angle, then step 810 is repeated until all frequencies are scanned for a given angle. Then at 840, the information obtained for each frequency is stored on the relay node. Subsequently, these operations are repeated again for each different scan angle. For example, at 850 and 860, steps 810, 820, 830, and 840 are repeated, until the 360 degree scan is complete for all frequencies. Then at 870, the number of carriers per donor access node can be determined from this information. Based on all measurements, the relay node can generate a final scan list indicating the number of different EARFCNs (carriers) scanned for the same donor access node (based on donor access node identifiers, e.g. PCI and eNB ID), and add this information to scan list, and attach to the donor access node with the highest number of carriers.

Figure 9:
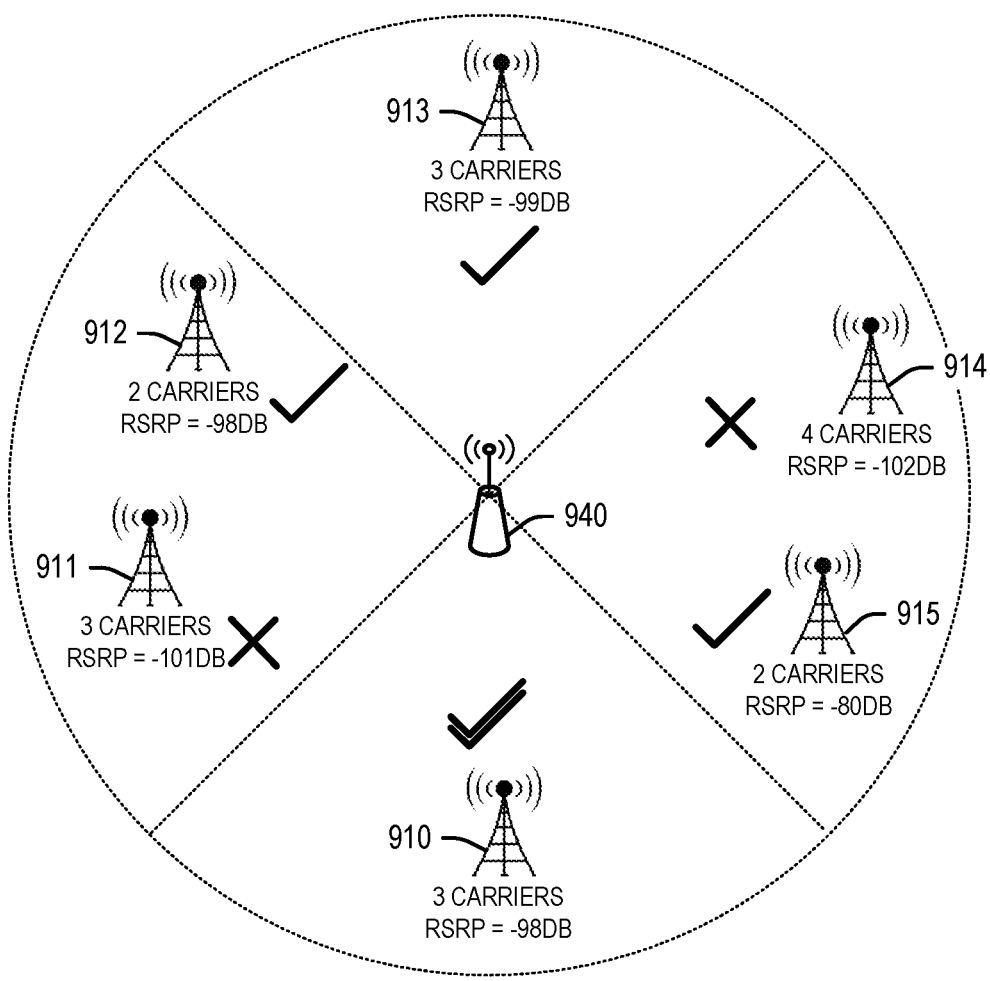
FIG. 9 depicts exemplary selections of donor access nodes from among a plurality of donor access nodes.

FIG. 9 depicts exemplary selections of donor access nodes from among a plurality of donor access nodes. Access nodes 910-915 are similar to access nodes 110, 120 in FIG. 1, and relay node 940 may be considered similar to relay node 140. Relay node 940, when activated or turned-on, can initiate scanning at various angles, and obtain network information for carriers transmitted at different frequencies for each of donor access nodes 910-915, using the methods described above. Further, relay node 940 is configured to measure a received signal strength for reference signals from each donor access node 910-915. In this example, donor access node 910 is configured to deploy 3 carriers, and has a reference signal receive strength measured at −98 dBm. Further, donor access node 911 is configured to deploy 3 carriers, and has a reference signal receive strength measured at −101 dBm, donor access node 912 is configured to deploy 2 carriers, and has a reference signal receive strength measured at −98 dBm, donor access node 913 is configured to deploy 3 carriers, and has a reference signal receive strength measured at −99 dBm, donor access node 914 is configured to deploy 4 carriers, and has a reference signal receive strength measured at −102 dBm, and donor access node 915 is configured to deploy 2 carriers, and has a reference signal receive strength measured at −80 dBm.

Whereas in the prior art, donor access node 915 may be selected as a donor for relay node 940 based solely on its RSRP being the highest, in accordance with the described embodiments, donor access node 910 is selected based on having the highest number of carriers and having an RSRP that is above a threshold. For example, if the threshold criteria for the RSRP is set at −100 dBm, then donor access nodes 914 and 911 are not considered potential donor access nodes for having RSRPs below −100 dBm, and donor access nodes 910, 912, 913, and 915 are considered potential donor access nodes. Further, among potential donor access nodes 910, 912, 913, and 915, donor access nodes 910 and 913 are determined to have the highest number of carriers (i.e. 3 carriers each). Between these two donor access nodes 910, 913, donor access node 910 has a higher RSRP than donor access node 913. Thus, donor access node 913 is selected to provide the backhaul for relay node 940.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for selecting a donor access node for a relay node based on a number of component carriers, the method comprising:
    identifying a plurality of potential donor access nodes for the relay node; and
    requesting to attach to a potential donor access node having a highest number of component carriers from among the plurality of potential donor access nodes.

2. The method of claim 1, wherein the identifying further comprises scanning for known frequency identifiers using one or more antennae of the relay node.

3. The method of claim 2, further comprising:
    identifying one or more carriers for a first known frequency identifier; and
    obtaining network information associated with each of the one or more carriers.

4. The method of claim 3, wherein the network information comprises at least one of: a network identifier, a donor access node identifier, and a carrier identifier.

5. The method of claim 4, further comprising determining a number of carriers deployed by each donor access node based on the network information.

6. The method of claim 3, further comprising:
    measuring a reference signal strength of each of the one or more carriers; and
    storing information for any carrier for which the reference signal strength meets a minimum threshold.

7. The method of claim 6, further comprising repeating the identifying the one or more carriers, obtaining, measuring, and storing for a plurality of known frequency identifiers.

8. The method of claim 7, further comprising repeating the scanning, identifying the one or more carriers, obtaining, measuring, and storing for the plurality of known frequency identifiers at each of a plurality of measurement angles.

9. The method of claim 1, wherein the requesting to attach to the potential donor access node having the highest number of component carriers from among the plurality of potential donor access nodes is performed despite a reference signal strength from the potential donor access node being lower than a reference signal strength from other donor access nodes.

10. A system for selecting a donor access node for a relay node based on a number of component carriers, the system comprising:
    a processor; and
    a memory coupled to the processor, the memory for storing instructions that enable the processor to perform operations comprising:
        identifying one or more potential donor access nodes deploying one or more carriers;
        measuring a reference signal strength for each of the one or more potential donor access nodes;
        determining which of the one or more potential donor access nodes deploys a highest number of component carriers;
        and
        sending a request to attach to the potential donor access node deploying the highest number of component carriers and having a reference signal strength that meets a reference signal criteria.

11. The system of claim 10, wherein identifying the one or more donor access nodes comprises scanning for known frequency identifiers using one or more antennae of a relay node.

12. The system of claim 11, wherein the operations further comprise:
    identifying one or more carriers for a first known frequency identifier; and
    obtaining network information associated with each of the one or more carriers, the network information comprising at least an identifier of the donor access node.

13. The system of claim 12, wherein the operations further comprise determining a number of carriers deployed by each donor access node.

14. The system of claim 11, wherein the scanning is performed for a plurality of different angles using the one or more antennae of the relay node.

15. The system of claim 10, wherein the reference signal criteria comprises a minimum signal level required by the relay node.

16. The system of claim 15, wherein the potential donor access node to which the request is sent has a signal level that is lower than other potential donor access nodes.

17. A processing node for selecting a donor access node for a relay node based on a number of component carriers, the processing node comprising a processor and a memory, the memory for storing instructions that enable the processor to perform operations comprising:
    determining a number of component carriers deployed by each of a plurality of potential donor access nodes within range of a relay node;
    determining that a reference signal strength of each component carrier meets a first threshold; and
    requesting to attach to the potential donor access node deploying the highest number of component carriers,
    wherein a reference signal strength of the potential donor access node is less than a reference signal strength of other potential donor access nodes.

18. The processing node of claim 17, wherein determining the number of component carriers comprises:
  obtaining network information broadcast by each component carrier; and
  determining an identity of each potential donor access node deploying one or more of the number of component carriers.

19. The processing node of claim 18, wherein determining the identity of each potential donor access node comprises obtaining a network identifier and an access node identifier from the network information.

20. The processing node of claim 18, wherein determining the number of component carriers deployed by each potential donor access node further comprises:
  obtaining carrier identifiers from the network information; and
  associating the carrier identifiers with the identity of each potential donor access node.

\* \* \* \* \*